(12) United States Patent
Jaworski

(10) Patent No.: US 12,084,895 B2
(45) Date of Patent: Sep. 10, 2024

(54) TAMPER PROOF CABLE LOCK

(71) Applicant: Steven Joseph Jaworski, Islip Terrace, NY (US)

(72) Inventor: Steven Joseph Jaworski, Islip Terrace, NY (US)

( * ) Notice: Subject to any disclaimer, the term of this patent is extended or adjusted under 35 U.S.C. 154(b) by 0 days.

(21) Appl. No.: 18/370,474

(22) Filed: Sep. 20, 2023

(65) Prior Publication Data

US 2024/0052676 A1 Feb. 15, 2024

Related U.S. Application Data

(63) Continuation of application No. 17/410,488, filed on Aug. 24, 2021, now Pat. No. 11,795,735, which is a continuation of application No. 15/966,477, filed on Apr. 30, 2018, now Pat. No. 11,098,502, which is a continuation-in-part of application No. 14/712,352, filed on May 14, 2015, now Pat. No. 9,957,735.

(60) Provisional application No. 61/993,523, filed on May 15, 2014.

(51) Int. Cl.
| | |
|---|---|
| *E05B 73/00* | (2006.01) |
| *D07B 1/06* | (2006.01) |
| *D07B 1/16* | (2006.01) |
| *F16B 2/06* | (2006.01) |
| *F16B 7/04* | (2006.01) |
| *F16B 5/02* | (2006.01) |
| *F16B 41/00* | (2006.01) |

(52) U.S. Cl.
CPC ........ *E05B 73/0005* (2013.01); *D07B 1/0693* (2013.01); *D07B 1/162* (2013.01); *F16B 2/06* (2013.01); *F16B 2/065* (2013.01); *F16B 7/0433* (2013.01); *F16B 5/02* (2013.01); *F16B 41/007* (2013.01)

(58) Field of Classification Search
CPC ... E05B 73/0005; D07B 1/0693; D07B 1/162; F16B 2/06; F16B 2/065; F16B 7/0433; F16B 5/02; F16B 41/007
See application file for complete search history.

(56) References Cited

U.S. PATENT DOCUMENTS

| | | | |
|---|---|---|---|
| 165,223 A | 7/1875 | Fox | |
| 1,122,871 A * | 12/1914 | Dinsmoor | ............. G09F 3/0352 |
| | | | 292/325 |
| 1,466,815 A * | 9/1923 | Dinsmoor | ............. G09F 3/0352 |
| | | | 292/317 |
| 1,652,233 A | 12/1927 | Branick | |

(Continued)

*Primary Examiner* — Mark A Williams
(74) *Attorney, Agent, or Firm* — Shore IP Group; Sean R. Wilsusen

(57) ABSTRACT

Provided is a cable lock including a locking clasp including first and second clasp components having first and second security cable connection arms. The locking clasp includes at least one groove. The at least one groove is configured to receive at least one device cable. The cable lock includes a security cable having a wire rope and a vinyl coating. The wire rope includes a plurality of wire strings arranged in a plurality of clusters. The first and second security cable connection arms of the locking clasp are coupled to a first end of the security cable. First and second stop sleeves are disposed on opposite sides of the first and second security cable connection arms. A device connection means is disposed at a second end of the security cable opposite the first end of the security cable.

20 Claims, 14 Drawing Sheets

(56) References Cited

U.S. PATENT DOCUMENTS

| | | | |
|---|---|---|---|
| 2,538,508 A * | 1/1951 | Di Palma | G09F 3/0352 |
| | | | 292/307 R |
| 3,380,267 A | 4/1968 | Winchester | |
| 3,667,259 A | 6/1972 | Reque et al. | |
| 4,750,898 A | 6/1988 | Soulard | |
| 5,259,220 A | 11/1993 | Fredrickson | |
| 5,468,103 A | 11/1995 | Leeson | |
| 5,794,463 A | 8/1998 | Mcdaid | |
| 5,796,041 A * | 8/1998 | Suzuki | H02G 15/18 |
| | | | 174/92 |
| 6,003,210 A | 12/1999 | Facey et al. | |
| 6,092,402 A | 7/2000 | Porcelli et al. | |
| 6,167,734 B1 | 1/2001 | Derman | |
| 6,294,737 B1 * | 9/2001 | Chestney | H01R 4/70 |
| | | | 174/74 A |
| 6,345,847 B1 * | 2/2002 | Dreisbach | G09F 3/0358 |
| | | | 292/307 R |
| 6,578,886 B1 * | 6/2003 | Bystry | G09F 3/037 |
| | | | 292/307 R |
| 6,779,943 B2 | 8/2004 | Shoen | |
| 7,128,605 B2 | 10/2006 | Montena | |
| 7,141,738 B2 | 11/2006 | Marsac et al. | |
| 7,152,439 B1 * | 12/2006 | Chang | E05B 37/025 |
| | | | 24/134 P |
| 7,223,132 B2 | 5/2007 | King, Jr. et al. | |
| 7,425,146 B2 | 9/2008 | Valentin | |
| 7,475,575 B1 | 1/2009 | Greenfield et al. | |
| 7,798,837 B1 | 9/2010 | Gardner et al. | |
| 8,063,306 B2 | 11/2011 | Zhong et al. | |
| 8,414,313 B2 | 4/2013 | Rodrigues et al. | |
| 8,578,566 B2 * | 11/2013 | Jolly | F16G 11/14 |
| | | | 292/307 R |
| 9,453,555 B2 | 9/2016 | Dingley et al. | |
| 9,923,356 B2 * | 3/2018 | Byczkiewicz | H02G 15/117 |
| 10,099,109 B2 | 10/2018 | Pittard et al. | |
| 10,797,410 B2 | 10/2020 | Hata et al. | |
| 10,840,615 B2 | 11/2020 | Newman | |
| 2005/0156438 A1 | 7/2005 | Ching | |
| 2006/0196016 A1 | 9/2006 | Cai et al. | |
| 2007/0284129 A1 | 12/2007 | Montena | |
| 2011/0273852 A1 * | 11/2011 | Debrody | G09F 3/0317 |
| | | | 361/747 |
| 2012/0103031 A1 | 5/2012 | Grant et al. | |
| 2015/0330110 A1 | 11/2015 | Jaworski et al. | |
| 2016/0298365 A1 * | 10/2016 | Christensen | E05B 75/00 |
| 2016/0356292 A1 * | 12/2016 | Chua | G09F 3/0352 |

\* cited by examiner

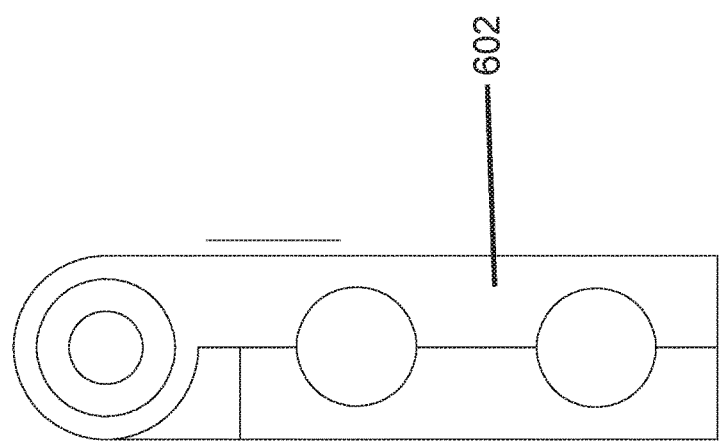
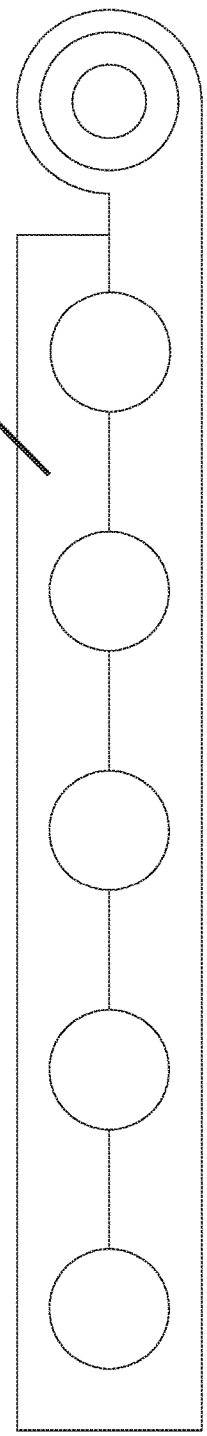
FIG. 3A
FIG. 3B
FIG. 3C

TAMPER PROOF CABLE LOCK

CROSS-REFERENCE TO RELATED APPLICATION

This application is a continuation of U.S. patent application Ser. No. 17/410,488, filed on Aug. 24, 2021, which is a continuation of U.S. patent application Ser. No. 15/966,477, filed on Apr. 30, 2018, which issued as U.S. Pat. No. 11,098,502 on Aug. 24, 2021, which is a continuation in part of U.S. patent application Ser. No. 14/712,352, filed on May 14, 2015, which issued as U.S. Pat. No. 9,957,735 on May 1, 2018, which claims priority from U.S. Provisional Patent Application No. 61/993,523, filed May 15, 2014, the entire contents of which are incorporated by reference herein.

TECHNICAL FIELD

Exemplary embodiments of the present invention relate to a cable lock for electrical cables and more particularly to a tamper proof cable lock for electrical and device cables associated with medical devices.

DISCUSSION OF RELATED ART

Medical facilities, such as hospitals, commonly use roving medical devices and medical equipment that can be transported to various locations in the medical facility. For example, emergency departments triage and deliver medical care for a wide array of medical problems requiring different medical devices and equipment. Similarly, operating rooms in medical facilities perform a multitude of surgeries requiring, for example, different electronic monitors and electrical leads for the monitors. Roving medical devices, such as bed side monitors, defibrillators and mobile vital signs monitors may be attached to portable stands that allow the devices to be quickly moved in and out of various locations in the medical facility.

Each medical device may require a unique combination of one or more electrical cables or leads for the device to be powered and operate correctly. Medical devices may also require unique combinations of electrical cables to perform a desired combination of tasks based on the medical needs or issues of a particularly patient. However, electrical cables are generally easily removable from the device that they are associated with. This results in a common and expensive problem of loss of electrical cables and device leads that may cost an individual medical facility upwards of millions of dollars annually.

Another common and expensive problem leading to a loss of electrical cables and leads occurs when a particular cable fails while the cable may still be under warranty, and the cable is discarded by hospital staff without the cable being submitted to the manufacturer for replacement. In particular, device cables are frequently lost or discarded in high traffic areas of hospitals, such as emergency departments and operating rooms. In addition to creating waste and increasing operational costs for medical facilities, the loss of device cables also indirectly increases the cost of healthcare for patients. Lost device cables may also decrease the availability of functional medical equipment in medical facilities and therefore indirectly lead to increased patient wait times and decreased quality of care. Therefore, a need exists for a tamper proof cable lock that will prevent the loss of electrical cables and leads.

SUMMARY

According to an exemplary embodiment of the present invention, a locking clasp includes a first clasp component having a first security cable connection arm and a second clasp component having a second security cable connection arm. The locking clasp includes at least one groove disposed between the first and second clasp components. The at least one groove is configured to receive at least one device cable. The cable lock includes a security cable having a wire rope and a vinyl coating surrounding the wire rope. The wire rope includes a plurality of wire strings arranged in a plurality of clusters. The first and second security cable connection arms of the locking clasp are coupled to a first end of the security cable. First and second stop sleeves are disposed on opposite sides of the first and second security cable connection arms. The first and second stop sleeves are coupled to the security cable. A device connection means is disposed at a second end of the security cable opposite the first end of the security cable.

According to an exemplary embodiment of the present invention, a locking clasp includes a first clasp component having a first security cable connection arm and a second clasp component having a second security cable connection arm. The locking clasp includes at least one groove disposed between the first and second clasp components. The at least one groove is configured to receive at least one device cable. The cable lock includes a security cable having a wire rope. The wire rope includes a plurality of wire strings arranged in a plurality of clusters. The first and second security cable connection arms of the locking clasp are coupled to a first end of the security cable. First and second stop sleeves are disposed on opposite sides of the first and second security cable connection arms. The first and second stop sleeves are coupled to the security cable. A device connection means is disposed at a second end of the security cable opposite the first end of the security cable.

BRIEF DESCRIPTION OF THE DRAWINGS

The above and other features of the present invention will become more apparent by describing in detail exemplary embodiments thereof, with reference to the accompanying drawings in which:

FIG. 3A to 3E are illustrations of locking clasps having one or more grooves according to exemplary embodiments of the present invention;

DETAILED DESCRIPTION

Figure 1A:
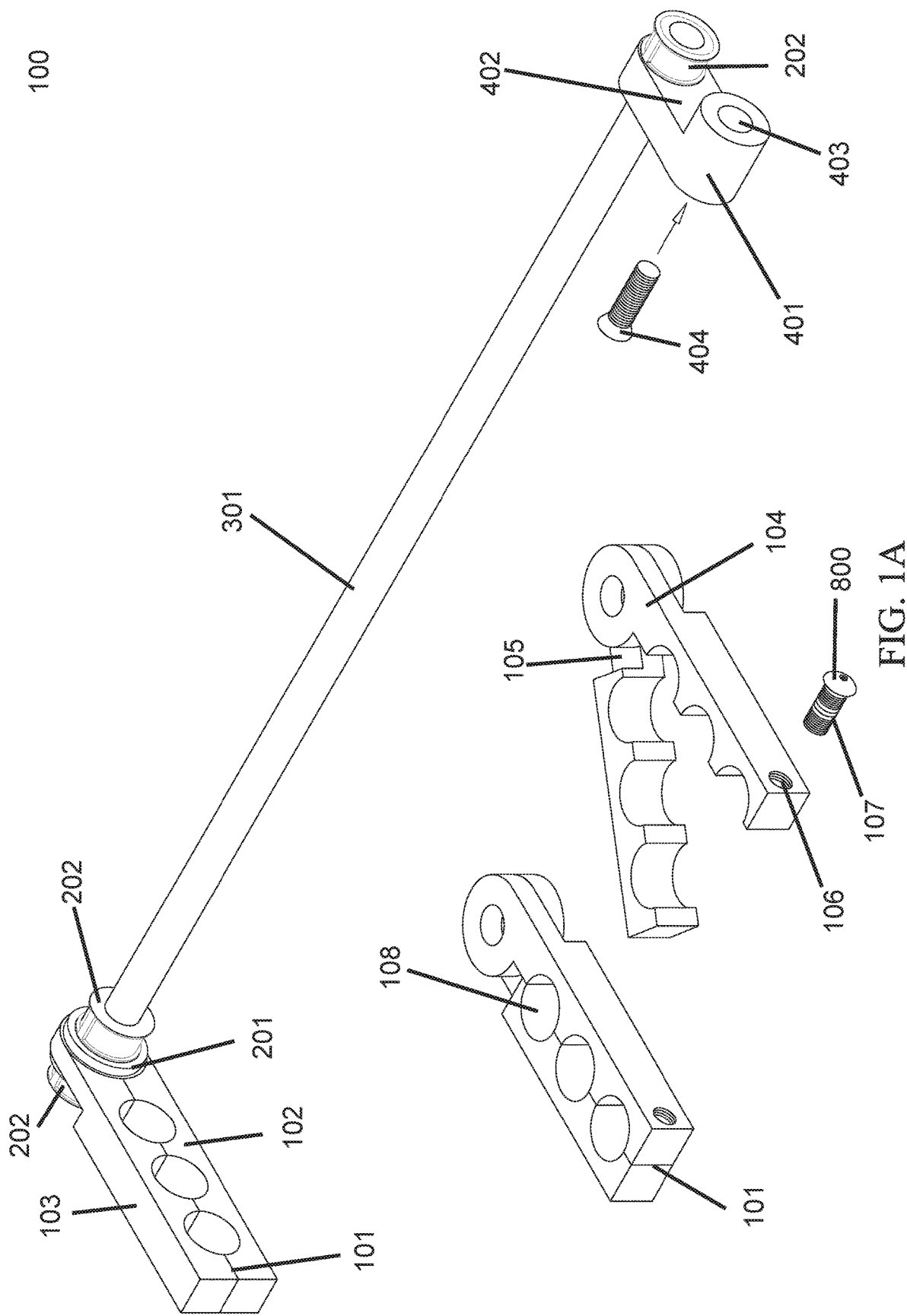
FIG. 1A is a perspective view illustrating a cable lock according to exemplary embodiments of the present invention, and a closed locking clasp, and an open locking clasp according to exemplary embodiments of the present invention.
Figure 1B:
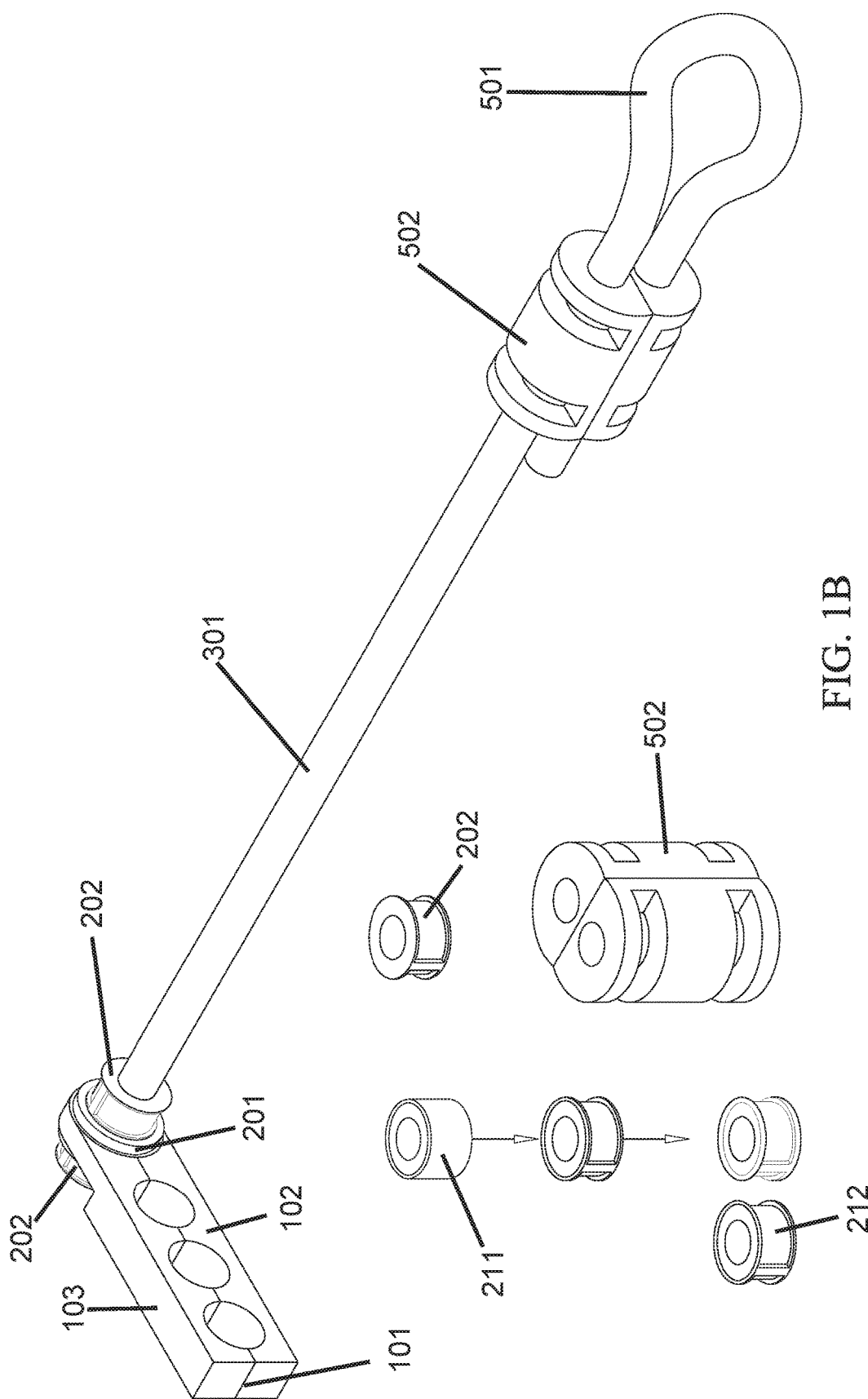
FIG. 1B is a perspective view illustrating a cable lock according to exemplary embodiments of the present invention, and an uncompressed stop sleeve, a compressed stop sleeve and a cable loop sleeve according to exemplary embodiments of the present invention.
Figure 2:
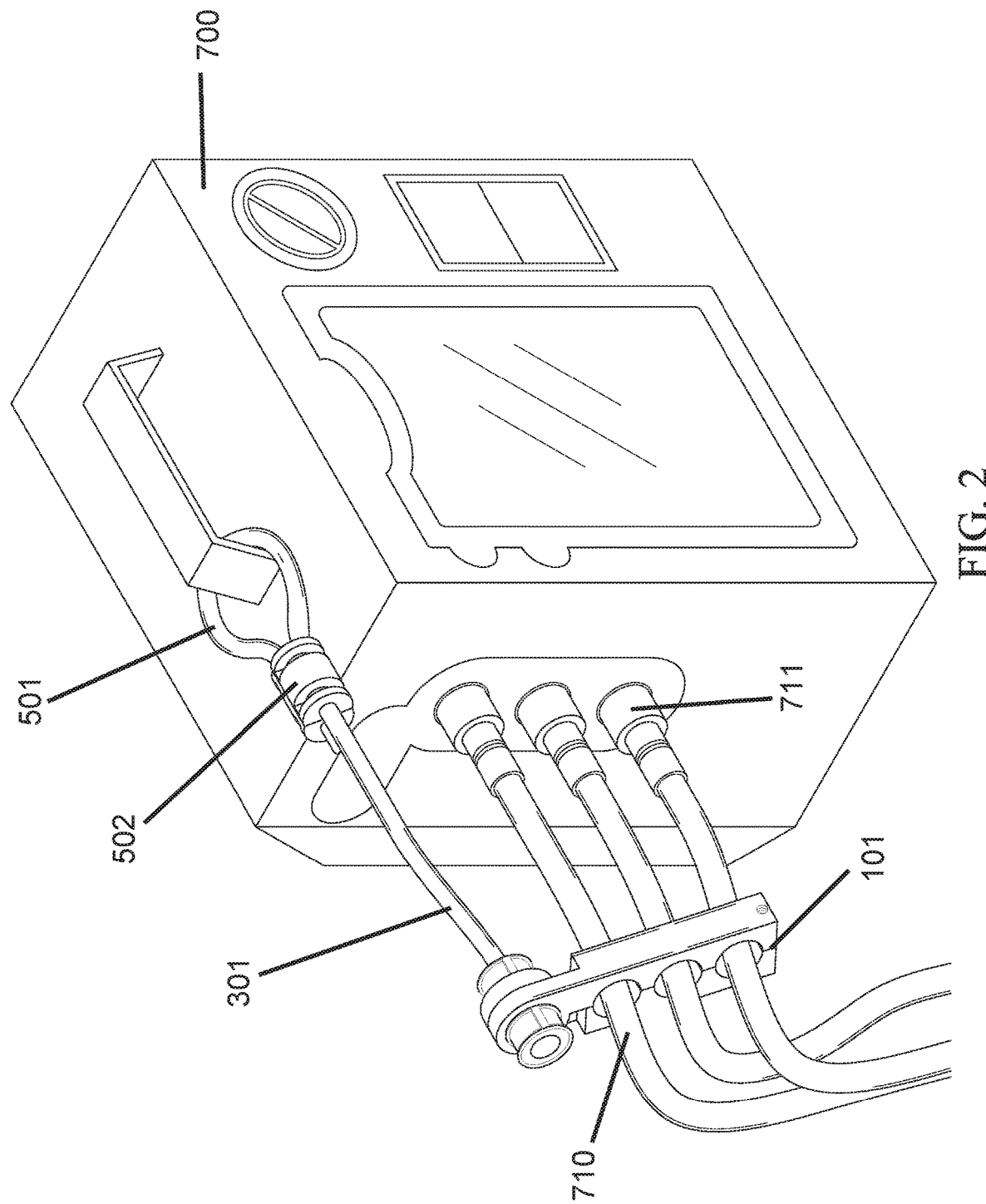
FIG. 2 is an illustration of the cable lock of FIG. 1B locked to a medical device according to exemplary embodiments of the present invention.
Figure 3D:
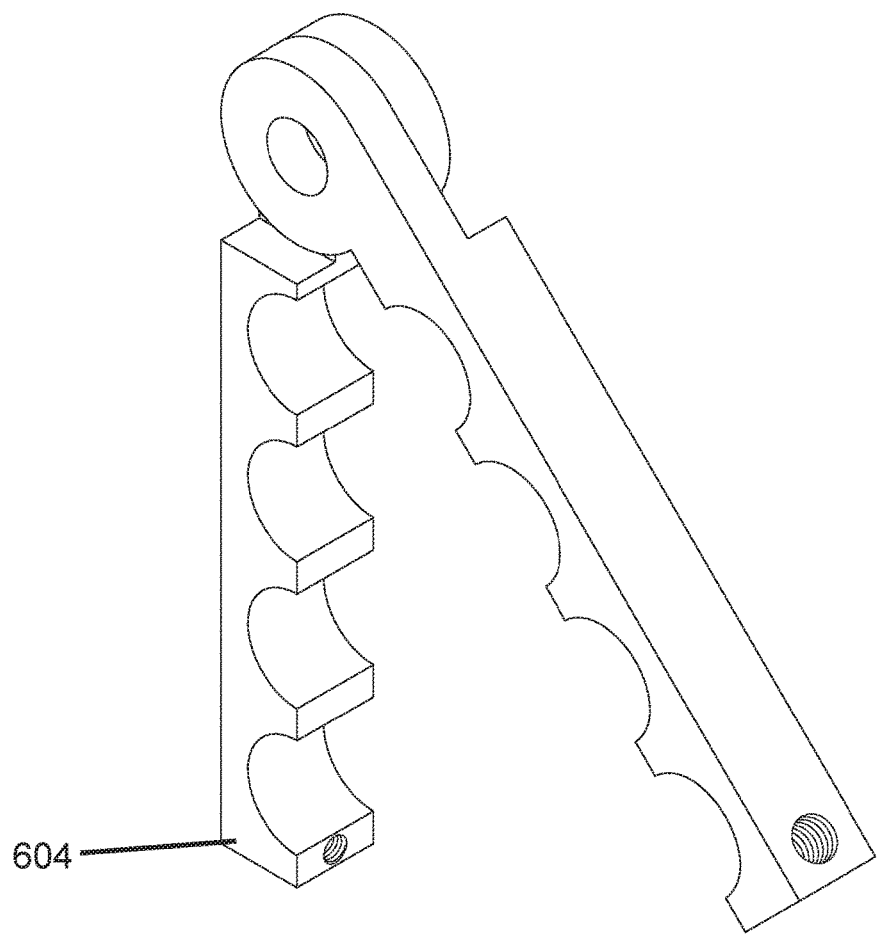
Figure 3E:
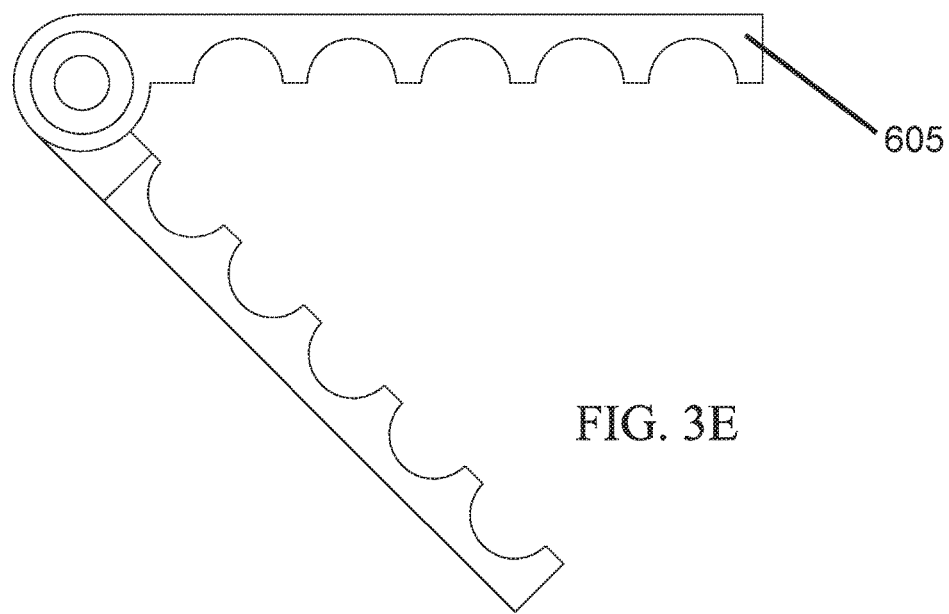

FIG. 1A is a perspective view illustrating a cable lock according to exemplary embodiments of the present invention, and a closed locking clasp, and an open locking clasp according to exemplary embodiments of the present invention. FIG. 2 is an illustration of the cable lock of FIG. 1B locked to a medical device according to exemplary embodiments of the present invention. FIG. 3A to 3E are illustrations of locking clasps having one or more grooves according to exemplary embodiments of the present invention.

Referring to FIGS. 1A, 2, and 3A to 3E, a cable lock 100 may include a locking clasp 101, a security cable 301 and a mounting bracket 401. The mounting bracket 401 and the locking clasp 101 may be rotatably attached to the security cable 301 by one or more stop sleeves 202 disposed on the security cable 301.

The locking clasp 101 may include a first clasp component 102 and a second clasp component 103. The first clasp component 102 may include a first security cable connection arm 104 and the second clasp component 103 may include a second security cable connection arm 105. The security cable connection arms 104 and 105 may each include a hole and the security cable 301 may pass through the holes to connect the locking clasp 101 to the security cable 301. The holes may be positioned shaped and dimensioned so that the security cable 301 passes through the holes with minimal effort, and to allow the first and second clasp components 102 and 103 to rotate substantially freely around the security cable 301. The first and second clasp components 102 and 103 of the locking clasp 101 may rotate together to close the locking clasp 101 around one or more device cables 710. The device cables 710 illustrated in FIG. 2 are exemplary device cables, however, device cables according to exemplary embodiments of the present invention are not limited thereto or thereby, and the locking clap 101 may secure any desired device cables, including cables of any combination of sizes and dimensions. The first and second clasp components 102 and 103 may each include a screw hole 106 configured to receive a tamper proof screw 107 at opposite ends of the first and second clasp components 102 and 103 from the security cable 301. The screw hole 106 may be threaded.

The locking clasp 101 may include one or more grooves 108. For example, the locking clasp 101 may include three grooves 108. According to exemplary embodiments of the present invention, the locking clasp 101 may include one, two, four or five grooves 108 (see locking clasps 601, 602, 605 and 604 of FIGS. 3A to 3E). However, any number of desired grooves 108 may be included in the locking clasp 101. The grooves 108 may be spaced apart from each other at equal distances in a straight line; however, exemplary embodiments of the present invention are not limited thereto or thereby. The grooves 108 may be unevenly spaced apart from each other, and the grooves 108 may be arranged in any desired configuration according to the device cables 710 disposed in the grooves 108. For example, a three groove 108 locking clasp 101 may include grooves 108 arranged in the shape of a triangle. Each of the grooves 108 may be configured to receive a central portion of a device cable 710 and may allow the device cable to freely pass through the groove 108, while ends 711 of the device cable 710 may be larger than the grooves 108 and cannot pass through the grooves 108. That is, the grooves 108 may allow a central portion of the device cable 710 to slide freely through the groove 108, while still preventing the device cable 710 from being separated from the locking clasp 101 and/or the cable lock 100. That is, the device cable 710 may be locked to the medical device 700. The grooves 108 may have a circular, oval, curved or rounded shape, however, the shapes of the grooves may be any shape corresponding to shapes of device cables disposed within the grooves 108. For example, the grooves 108 may have a substantially square or a substantially rectangular shape to accommodate device cables corresponding to a substantially square or rectangular shape. A first groove 108 of a locking clasp 101 may have a first shape and a second groove 108 of the same locking clasp 101 may have a second shape that is different than the first shape.

The locking clasp 101 may include a hard plastic. The hard plastic may be substantially tamper proof and not readily breakable using tools and equipment commonly found in a medical facility. The locking clasp 101 may have rounded edges in some or all corners or edges of the locking clasp 101. For example, the locking clasp 101 may be printed on a MakerBot Replicator 2 3D Printer (available from MakerBot Industries, LLC, Brooklyn, New York). The hard plastic may be a MakerBot Brand Filament in (e.g., MakerBot "True Black" filament 1.75 mm diameter on a 1 kg spool (Part No. MP03257), available from MakerBot Industries, LLC, Brooklyn, New York). However, the locking clasp 101 and the clasp components 102 and 103 are not limited thereto or thereby, and the clasp components 102 and 103 may include any suitable material for forming the locking clasp 101.

The locking clasp 101 may be locked by the tamper proof screw 107 connecting an end of the first clasp component 102 opposite to the security cable 301 to an end of the second clasp component 103 opposite to the security cable 301. The tamper proof screw 107 may include a tamper proof screw head 800. The tamper proof 107 screw may include stainless steel. For example, the tamper proof screw 107 may be a Low Profile Button Head Torx Machine screw. For example, the first tamper proof screw may be a Pan Head Torx Machine Screw (e.g., a Stainless Steel Low Profile Button Head Torx with a T10 Drive, Bolt thread diameter of 6-32 and bolt thread length of ¾" manufactured by McMaster-Carr (Product Number: 90910A740), available from McMaster-Carr, Robbinsville, New Jersey). The tamper proof screw 107 may be counter sunk in the screw hole 106 so that the head of the tamper proof screw 107 cannot be accessed by using conventional tools, such as a wrench or pliers. However, the tamper proof screw 107 and the tamper proof screw head 800 are not limited thereto or thereby, and the tamper proof screw 107 and the tamper proof screw head 800 may be any suitable tamper proof screw or tamper proof screw head. That is, the tamper proof screw head 800 may include any shape or orientation that can prevent unlocking of the locking clasp 101 using tools readily available in a medical facility.

The tamper proof screw 107 may be partially or fully removed and the first and second clasp components 102 and 103 may be separated and opened by rotating the first and second clasp components 102 and 103 about the security cable 301 in opposite directions. Opening the locking clasp 101 may allow the insertion of one or more device cables 710 into the grooves 108 of the locking clasp 101.

The mounting bracket 401 and the locking clasp 101 may be rotatably attached to the security cable 301 by one or more stop sleeves 202 disposed on the security cable 301. The stop sleeves 202 may include aluminum. The stop sleeves 202 may be configured to freely slide onto the security cable 301 and be crimped or compressed into place at a desired location through the application of force (see e.g., FIG. 1B, illustrating uncompressed stop sleeves 211 and compressed stop sleeves 212). For example, the stop sleeves 202 may be about 1/8" or about 3/16" (e.g., manufactured by McMaster-Carr (Product Number: 3914T3 for 1/8" and 3914T5 for 3/16"), available from McMaster-Carr, Robbinsville, New Jersey). For example, a 1/8" stop sleeve 202 may be disposed on the security cable 301 at an outside end of the locking clasp 101 to prevent the locking clasp 101 from being removed from the security cable 301. A 3/16" stop sleeve 202 may be disposed on an inside end of the locking clasp 101. A smaller stop sleeve 202 may be disposed on the security cable 301 where a vinyl coating on the security cable 301 has been stripped away. That is, smaller stop sleeves 202 may be used to make solid contact with an exposed wire of the security cable 301. That is, the stop sleeve 202 may be in direct metal to metal contact with a stainless or galvanized steel center of the security cable 301. A larger stop sleeve 202 may be used when the vinyl coating has not been removed. However, the stop sleeves 202 are not limited thereto or thereby, and any desired stop sleeve 202 size may be used according to a diameter and/or material of the security cable 301.

One or more washers 201 may be disposed on the security cable 301 between the locking clasp 101 and the stop sleeves 202. The washers 201 may increase the ability of the locking clasp 101 to rotate freely around the security cable 301. For example, as illustrated in FIG. 1A, the washer 201 may be disposed on the security cable 301 between the stop sleeve 202 disposed on the outside of the locking clasp 101 and the locking clasp 101, and another washer 201 may be disposed on the security cable 301 between the locking clasp 101 and the stop sleeve 202 disposed on the inside of the locking clasp 101.

A relatively small amount of excess security cable 301 may be left on outside ends of the stop sleeves 202 in order to increase the contact between the stop sleeves 202 and the security cable 301 and to decrease the failure rate of a compressed stop sleeve (see e.g., compressed stop sleeve 212 of FIB. 1B). That is, a wire tail may be left on cut ends of the security cable 301 to prevent the stop sleeves 202 from being forcibly removed from ends of the security cable 301. The wire tails may be capped, for example, by using liquid vinyl 220 in a manner similar to a capping of the stop sleeves 202 (see e.g., FIG. 5).

The security cable 301 may be a stainless steel coated cable, for example. The security cable 301 may be any desired cable which is not easily cut using standard tools and equipment commonly found in a medical facility. For example, the security cable 301 may be a vinyl coated galvanized steel or stainless steel wire rope. The security cable 301 may include a plurality of stainless steel or galvanized steel strings which are combined to form the wire rope.

Figure 7A:
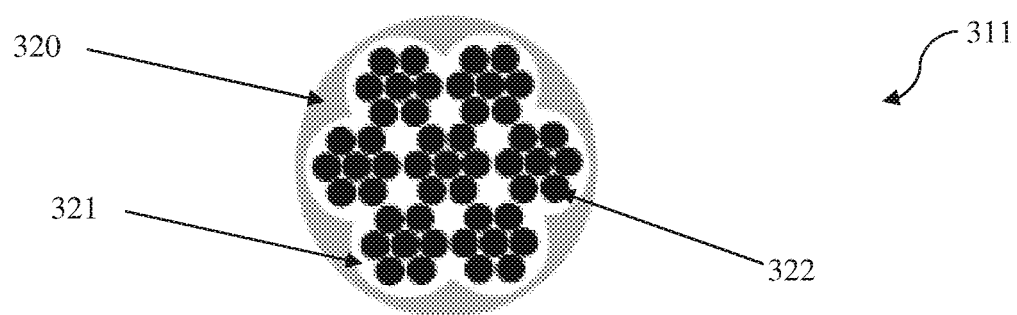
FIG. 7A and FIG. 7B are cross-sections of security cables according to exemplary embodiments of the present invention.
Figure 7B:
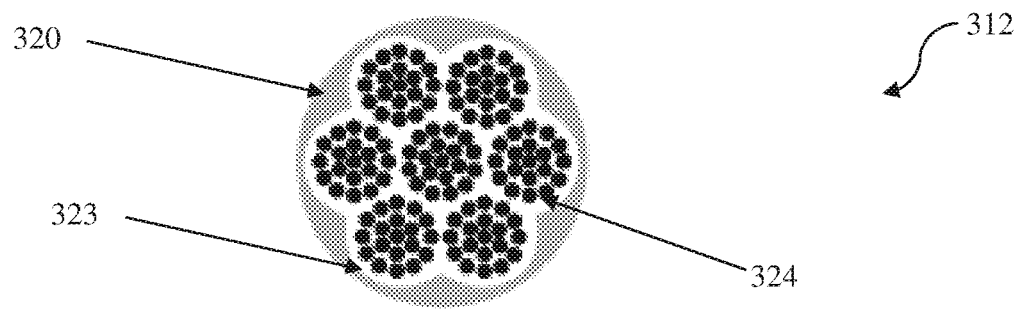

FIG. 7A and FIG. 7B are cross-sections of security cables according to exemplary embodiments of the present invention.

Referring to FIGS. 7A and 7B, according to an exemplary embodiment of the present invention, the security cable 301 may include a wire rope including a vinyl coating 320 surrounding the wire rope. For example, referring to FIG. 7A, wire rope 311 may be surrounded by vinyl coating 320. Wire rope 311 may include a plurality of wire strings 322 arranged in a plurality of clusters 321. Referring to FIG. 7B, wire rope 312 may be surrounded by vinyl coating 320. Wire rope 312 may include a plurality of wire strings 323 arranged in a plurality of clusters 324.

According to exemplary embodiments of the present invention, the wire rope may include seven clusters of wire strings, and each of the clusters of wire strings may include seven strings, which are combined to form the wire rope (see FIG. 7A). According to an exemplary embodiment of the present invention, the wire may include seven clusters of strings, and each of the clusters of strings may include 19 strings, which are combined to form the wire rope (see FIG. 7B). According to exemplary embodiments of the present invention, the security cable 301 may include any desired arrangement of stainless or galvanized strings combined to form clusters, and the clusters of strings may be combined to form stainless or galvanized steel wire rope. The wire rope may be coated in a vinyl or polypropylene material.

The security cable 301 may be of any desired length, for example, according to a size of medical equipment 700 or the device cables 710 being locked to the medical equipment 700. The medical equipment 700 illustrated in FIG. 2 is an exemplary medical device, however, the medical equipment 700 according to exemplary embodiments of the present invention is not limited thereto or thereby. Exemplary embodiments of the present invention may be used with any desired medical equipment. A length of the security cable 301 may vary according to an attachment point used on the medical equipment 700. The security cable 301 may include a 1/8" steel rope (e.g., cable) with a vinyl coating. The diameter of the combined steel rope and vinyl coating may be 3/16". A breaking strength of the cable may be about 1,700 Lbs. For example, the security cable 301 may be a fluorescent colored vinyl-coated galvanized steel wire rope (available from McMaster-Carr, Robbinsville, New Jersey). However, the security cable 301 is not limited thereto or thereby, and the security cable may be any desired security cable.

According to an exemplary embodiment of the present invention the mounting bracket 401 may include a security cable connection arm 402 and a screw hole 403 for screwing the mounting bracket 401 to a medical device. The screw hole 403 may include an indentation configured to receive a counter sunk head of a tamper proof mounting screw 404 comprising a counter sunk head, so that the counter sunk head of the tamper proof mounting screw 404 may be disposed flush against the mounting bracket 401. The tamper proof mounting screw 404 with flush mount head will be described in more detail below. A side of the mounting bracket 401 opposite to the head of the tamper proof mounting screw 404, and which is configured to contact a medical device, may include a plurality of peaks and valleys (e.g., including a plurality of spikes or pyramids). A vinyl or rubber material may be disposed between the mounting bracket and the medical device. The plurality of peaks and valleys of the mounting bracket 401 may increase the strength of the contact between the mounting bracket 401 and the vinyl or rubber material.

The security cable 301 may be disposed in the security cable connection arm 402 and an end of the security cable 301 on an outside of the mounting bracket 401 may be capped with a stop sleeve 202 to lock the mounting bracket 401 on the security cable 301. For example, a 1/8" stop sleeve 202 may be disposed on the security cable 301 at an outside end of the mounting bracket 401 to prevent the mounting bracket 401 from being removed from the end of the security cable 301. The screw hole 403 may be threaded and configured to receive the tamper proof mounting screw 404. The screw hole 403 may be slightly larger than the tamper proof mounting screw 404 and thus the screw hole 403 may rotate freely around the tamper proof mounting screw 404. The mounting bracket 401 may include a hard plastic. The hard plastic may be substantially tamper proof and might not be readily breakable using tools and equipment commonly found in a medical facility. For example, the mounting bracket 401 may be printed on a MakerBot Replicator 2 3D Printer (available from MakerBot Industries, LLC, Brooklyn, New York). The hard plastic may be a MakerBot Brand Filament (e.g., MakerBot filament in "True Black" 1.75 mm diameter on a 1 kg spool (Part No. MP03257), available from MakerBot Industries, LLC, Brooklyn, New York). However, the mounting bracket 401 is not limited thereto or thereby, and the mounting bracket 401 may include any suitable material for forming the mounting bracket 401. Alternative exemplary embodiments of mounting brackets will be described in more detail below.

The tamper proof mounting screw 404 of the mounting bracket may be configured to pass through the screw hole 403 of the mounting bracket 401 and thread directly into a screw port of a medical device. For example, the tamper proof mounting screw 404 may be positioned, shaped and dimensioned to thread into an unused or available screw port on the medical device. For example, the tamper proof mounting screw 404 may be a Flat Head Pin-In-Torx Machine Screws configured to attach to a GCX Compatible Mounting Bracket on a bottom of a GCX monitor arm (e.g., Stainless Steel Pin-In-Torx Machine Screws with a T30 pin holed specialty drive, Bolt thread diameter M6 and bolt thread length of 30 mm (Product Number: 91870A5340), available from McMaster-Carr, Robbinsville, New Jersey). However, the tamper proof mounting screw 404 is not limited thereto or thereby, and any desired tamper proof mounting screw 404 may be used, for example, according to available screw ports on a particular medical device.

The tamper proof mounting screw 404 may include the flush mount head. For example, the tamper proof mounting screw 404 with flush mount head may be a pin-in-torx bolt (e.g. torx screw manufactured by McMaster-Carr (Product No. 91870A534), available from McMaster-Carr, Robbinsville, New Jersey).

The tamper proof mounting screw 404 may be threaded, for example, into a support arm, transport dolly or other equipment to which a medical device or medical equipment is mounted. The tamper proof mounting screw 404 may be affixed to any component of medical devices or associated transport equipment to affix the cable lock 100 to the medical devices. The tamper proof mounting screw 404 may be affixed in such a manner that affixing the tamper proof mounting screw 404 to the device does not void the device manufacturer's warranty.

FIG. 1B is a perspective view illustrating a cable lock according to exemplary embodiments of the present invention, and an uncompressed stop sleeve, a compressed stop sleeve and a cable loop sleeve according to exemplary embodiments of the present invention. FIG. 2 is an illustration of the cable lock of FIG. 1B locked to a medical device according to exemplary embodiments of the present invention.

Referring to FIG. 1B and FIG. 2, according to an exemplary embodiment of the present invention, the mounting bracket of the cable lock 200 may be a mounting portion of the security cable 301 formed by looping the security cable 301 at an end of the security cable 301 opposite to the locking clasp 101 and securing the looped end with a cable loop sleeve 502 to form a cable loop 501. The cable loop 501 may be of any suitable size for attaching the cable loop 501 to a medical device 700. The cable loop 501 may be positioned, shaped and dimensioned to be attached to any medical device, for example, to a handle of the medical device. For example, the cable loop 501 may connect to a handle of an MRX Defibrillator. The cable loop sleeve 502 may be a 3/16" sleeve that is compressed or crimped around portions of the security cable 301 to form the cable loop 501 (e.g., a sleeve manufactured by McMaster-Carr (Product Number: 3896T5), available from McMaster-Carr, Robbinsville, New Jersey).

Referring to FIG. 1B, according to exemplary embodiments of the present invention, the stop sleeves 202 may be compressed stop sleeves 212. For example, a stop sleeve 202 may include compressed aluminum. An uncompressed stop sleeve 211 may be compressed to form a compressed stop sleeve 212. The uncompressed stop sleeve 211 may be placed at a desired position along the security cable 301 and may be compressed to form compressed stop sleeve 212. The uncompressed stop sleeves 211 may be compressed or crimped using any desired compression or crimping tool.

Referring to FIG. 1B, the cable loop sleeve 502 may be a pair of two cable loop sleeve blocks. The cable loop sleeve blocks may include a hard plastic. The hard plastic may be substantially tamper proof and might not be readily breakable using tools and equipment commonly found in a medical facility. For example, the cable loop sleeve blocks may be printed on a MakerBot Replicator 2 3D Printer (available from MakerBot Industries, LLC, Brooklyn, New York). The hard plastic may be a MakerBot Brand Filament (e.g., MakerBot filament in "True Black" 1.75 mm diameter on a 1 kg spool (Part No. MP03257), available from MakerBot Industries, LLC, Brooklyn, New York). However, the cable loop sleeve blocks are not limited thereto or thereby, and the cable loop sleeve blocks may include any suitable material for forming the cable loop sleeve blocks.

The cable loop sleeve blocks may each include a pass through channel including a first groove configured to receive a compression fitting (e.g., stop sleeves 202) to lock the compression fitting in position within the cable loop sleeve blocks. The pass through channel may project from two sides of the first groove and may allow the compression fitting to be substantially fixed in position in the first groove, while allowing the security cable 301 to project out of two ends (e.g., opposite ends) of the cable loop sleeve blocks. The cable loop sleeve blocks may each include a non-pass through channel which ends at a second groove configured to receive a compression fitting to lock the compression fitting in position within the cable loop sleeve blocks. When the cable loop sleeve 502 is the pair of two cable loop sleeve blocks, the security cable 301 may include two compression fittings coupled to the security cable 301, which are configured to be locked in position inside the cable loop sleeve blocks. Each of the compression fittings configured to be locked in position inside the cable loop sleeve blocks may be coupled to the security cable 301 in a position where the vinyl coating has been removed from the security cable.

Thus, each of the compression fittings may be coupled to the security cable 301 though a metal to metal connection. A first compression fitting configured to be disposed in the second groove of the cable loop sleeve block may be coupled to an end of the security cable 301. A second compression fitting configured to be disposed in the first groove of the cable loop sleeve block may be coupled to a central portion of the security cable 301. The position of the second compression fitting may be adjusted to form cable loops 501 of varying sizes, as desired.

The cable loop sleeve blocks may each include two or more screw holes for coupling the cable loop sleeve blocks together. Screws may be disposed in each of the two or more screw holes. The screws may include counter sunk heads disposed in an outer surface of the cable loop sleeve blocks. The cable loop sleeve blocks may include two or more guiding protrusions and two or more guide holes configured to receive the guiding protrusion. The guiding protrusions may be configured to guide the cable loop sleeve blocks together to have a substantially square shape or a substantially rectangular shape, for example. However, shapes and sizes of the cable loop sleeve blocks may be changed, as desired.

The cable loop sleeve blocks may be coupled to each other through a flexible hinge. The flexible hinge may include any suitable material for allowing the cable loop sleeve blocks to fold open, while still being coupled to each other. For example, the flexible hinge may include the tamper proof hard plastic described herein.

Figure 4A:
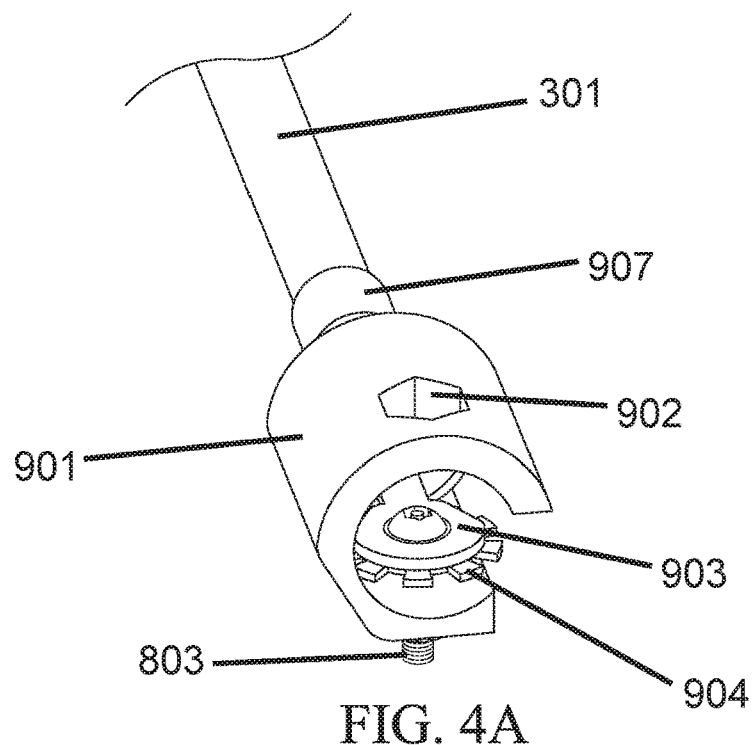
FIGS. 4A and 4B are perspective views of a mobile monitor mount according to exemplary embodiments of the present invention.
Figure 4B:
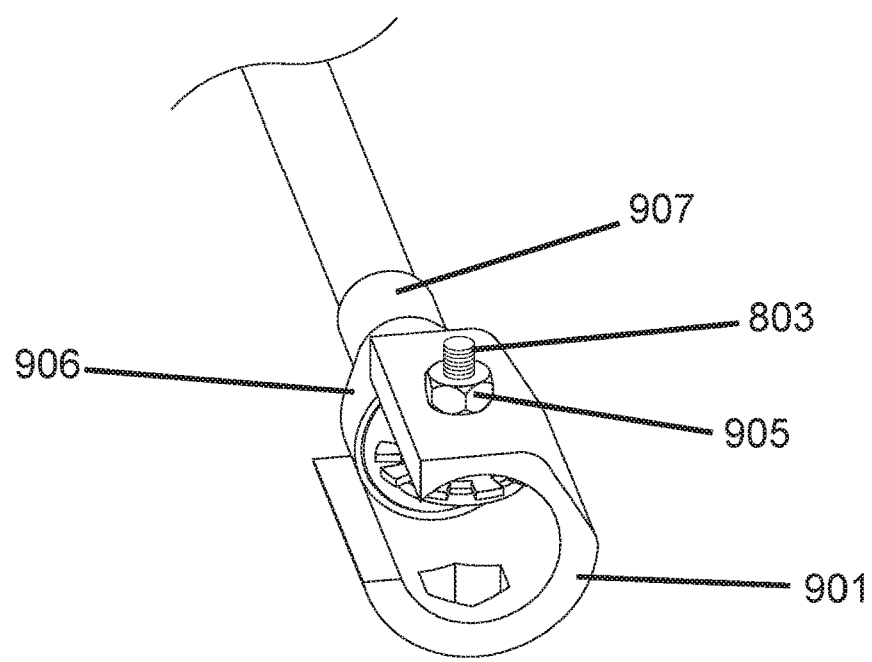

FIGS. 4A and 4B are perspective views of a mobile monitor mount according to exemplary embodiments of the present invention.

Referring to FIGS. 4A and 4B, the mobile monitor mount 300 may include a mobile monitor mount body 901, a wire terminal 906, a wire terminal head 903, a wire terminal cable connection member 907, a compression washer 904, a bolt 803 and a nut 905. The mobile monitor mount 300 may be disposed on the security cable 301 at a same or similar position to that of the mounting bracket 401 of FIG. 1A. The mobile monitor mount 300 may be disposed on the security cable 301 that is the same or similar to the security cable 301 described with reference to FIGS. 1A, 1B, 7A and 7B. The mobile monitor mount body 901 may include a hard plastic including a plurality of hard plastic filaments. The hard plastic may be substantially tamper proof and not readily breakable using tools and equipment commonly found in a medical facility. For example, the mobile monitor mount body 901 may be printed on a MakerBot Replicator 2 3D Printer (available from MakerBot Industries, LLC, Brooklyn, New York). The hard plastic may be a MakerBot Brand Filament (e.g., MarkerBot filament in "True Black" 1.75 mm diameter on a 1 kg spool (Part No. MP03257), available from MakerBot Industries, LLC, Brooklyn, New York). However, the mobile monitor mount body 901 is not limited thereto or thereby, and the mobile monitor mount body 901 may include any suitable material.

The mobile monitor mount body 901 may be a substantially open cylinder that is open or partially open on three sides. The open side may allow visualization of the compression washer 904, wire terminal head 903 and a head of the bolt 803 disposed therein.

The mobile monitor mount body 901 may include an access hole 902 and a connection hole. The bolt 803 may protrude through the connection hole, and the connection hole may be covered by a head of the bolt 803 and/or the compression washer 904. The access hole 902 may provide access to the connection hole, and may allow the bolt 803 to pass through the access hole 902 and be disposed in the connection hole with a head of the bolt 803 and the compression washer 904 disposed within the mobile monitor mount body 901. The compression washer 904 may be disposed on an interior of the mobile monitor mount body 901. The compression washer 904 may include a hole which is in line with the connection hole and a hole in the wire terminal head 903. A threaded portion of the bolt 803 may be disposed in the connection hole, in the hole in the wire terminal head 903, a hole in the compression washer 904 and the connection hole. That is, the bolt 803 may be inserted into the wire terminal head 903, the compression washer 904 and the connection hole to connect the wire terminal 906 to the mobile monitor mount body 901. The nut 905 may be disposed on the bolt 803 on an outside of the mobile monitor mount body 901. The nut 905 may be threaded onto the bolt 803 when the mobile monitor mount 300 is not in use to prevent loss of the nut 905. When the mobile monitor mount body 901 is coupled to the medical device, the bolt 803 may be disposed in a port on the medical device and the nut 905 may be disposed on the bolt 803 to secure the mobile monitor mount 300 to the medical device.

Figure 6:
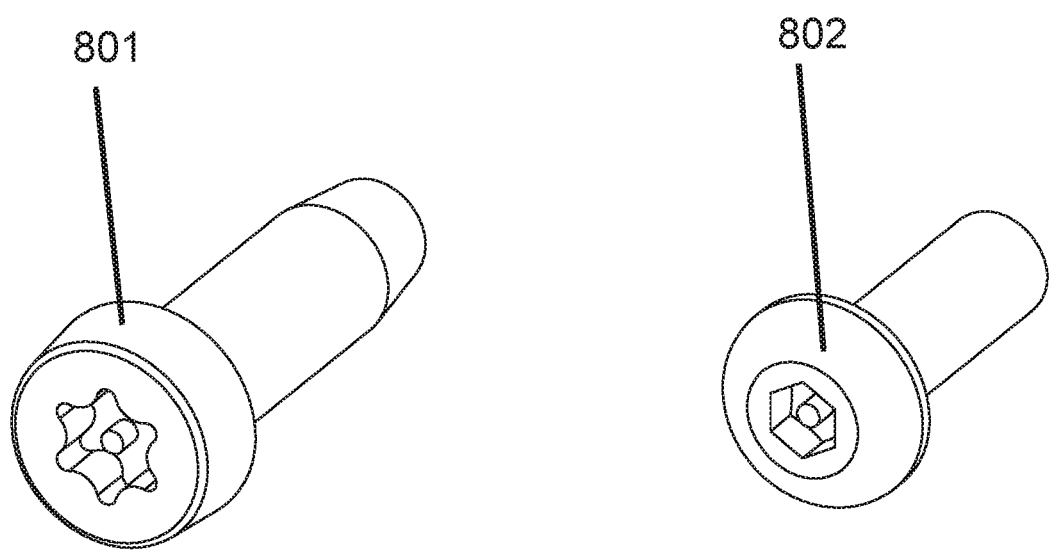
FIG. 6 is an illustration of exemplary tamper proof screw and bolt heads according to exemplary embodiments of the present invention.

The bolt 803 may include a tamper proof screw head (see, e.g., tamper proof screw head 801 or tamper proof screw head 802 illustrated in FIG. 6). For example, the bolt 803 may be a low profile Torx machine screw. For example, the bolt 803 may be a Pan Head Torx Machine Screw (e.g., Stainless Steel Low Profile Button Head Torx with a T10 Drive, Bolt thread diameter of 6-32 and bolt thread length of ½" manufactured by McMaster-Carr (Product Number: 90910A735), available from McMaster-Carr, Robbinsville, New Jersey). However, the bolt 803 is not limited thereto or thereby, and the bolt 803 may be any suitable bolt. That is, the bolt 803 may include any desired shape or any desired head.

The nut 905 may be an undersized machine screw (e.g., Zinc-Plated Steel Undersized Machine Screw Hex Nut, Nut thread diameter of 6-32, nut height of ³⁄₃₂", and width of ¼" manufactured by McMaster-Carr (Product Number: 90760A007), available from McMaster-Carr, Robbinsville, New Jersey). However, the nut 905 is not limited thereto or thereby, and the nut 905 may be any suitable nut.

The mobile monitor mount body 901 may be positioned, shaped and dimensioned to prevent the bending and breaking of the wire terminal 906 through the application of mechanical force. For example, the shape of the mobile monitor mount body 901 may prevent creasing and breaking off of the wire terminal 906 by preventing bending of the wire terminal back and forth until it breaks away from the mobile monitor mount body 901. That is, the shape of the mobile monitor mount body 901 may allow a relatively small amount of movement between the wire terminal 906 and the mobile monitor mount body 901.

The wire terminal 906 may include the wire terminal head 903 having the hole disposed therein and the wire terminal cable connection member 907. The wire terminal cable connection member 907 may be coupled to the security cable 301. The wire terminal cable connection member 907 may be coupled to the security cable 301 by a compression fitting that is coupled to the security cable 301. The compression fitting may be a plastic coated compression fitting.

The wire terminal 906 may be a non-insulated wire terminal (e.g., wire terminal manufactured by McMaster-Carr (Product Number: 7113K17), available from McMaster-Carr, Robbinsville, New Jersey). Alternatively, the wire terminal 906 may be a ring terminal or a metal ring terminal.

However, the wire terminal 906 is not limited thereto or thereby, and the wire terminal 906 may be any suitable wire terminal.

Figure 5:
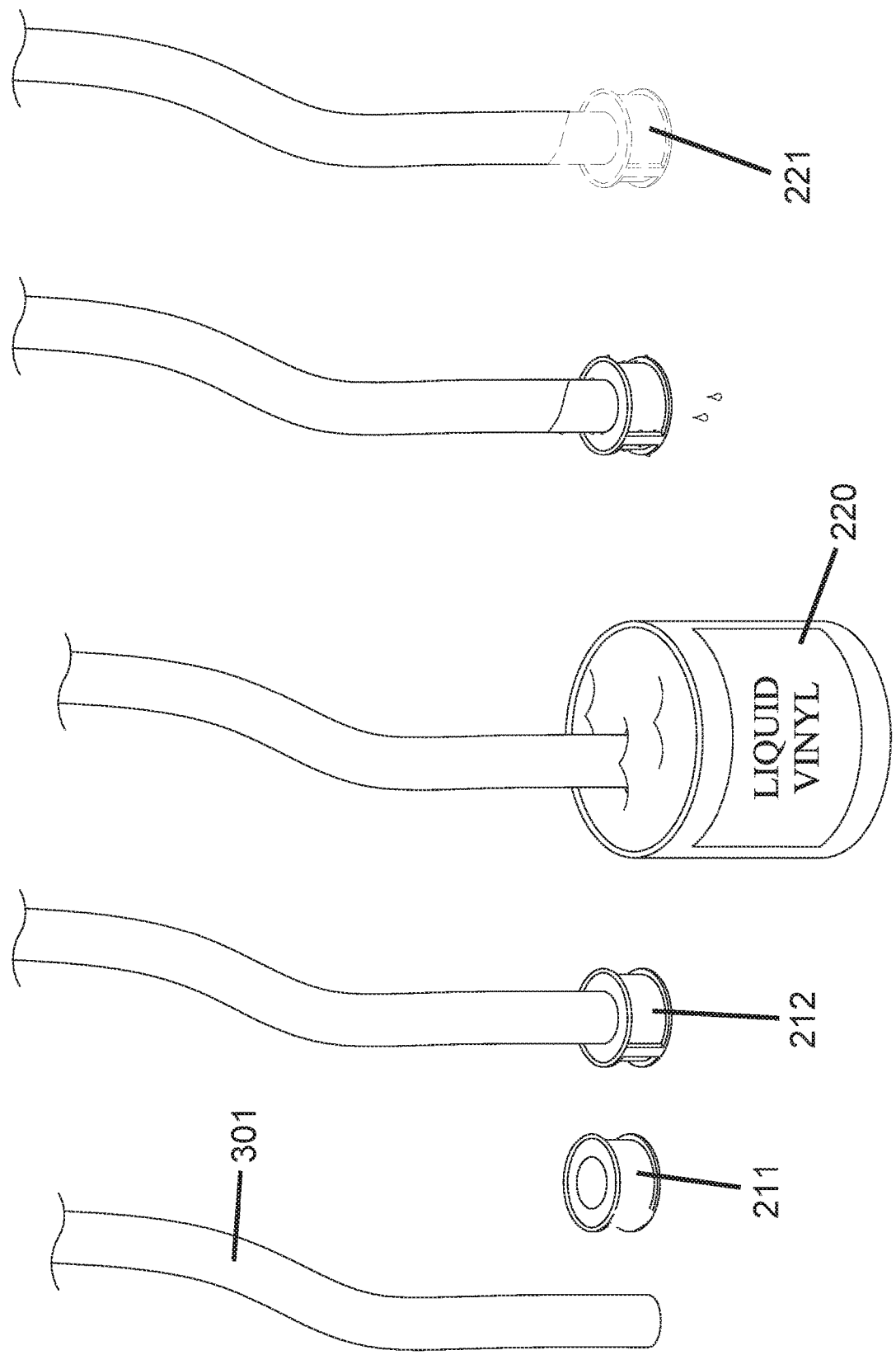
FIG. 5 is an illustration of a method of coating a stop sleeve in liquid vinyl and a stop sleeve coated in liquid vinyl according to exemplary embodiments of the present invention.

FIG. 5 is an illustration of a method of coating a stop sleeve in liquid vinyl and a stop sleeve coated in liquid vinyl according to exemplary embodiments of the present invention.

Referring to FIG. 1A, FIG. 1B and FIG. 5, the stop sleeves 202 and/or a portion of the security cable 301 adjacent to the stop sleeves 202 may be coated in a rubberized or coating material, such as liquid vinyl 220. Coating the stop sleeves 202 in liquid vinyl 220 may reduce a growth of bacteria on the area coated in liquid vinyl 220. The liquid vinyl 220 coating may prevent injury from occurring through contact with sharp metal barbs that may exist on compressed stop sleeves 212 that include aluminum or other compressed metal.

FIG. 6 is an illustration of exemplary tamper proof screw and bolt heads according to exemplary embodiments of the present invention.

Referring to FIG. 6 the bolts and screws described herein may include a tamper proof head. For example, the tamper proof heads may include a hexagon screw head 802 with a raised central protrusion or a star screw head 801 with a raised central protrusion. However, the tamper proof heads are not limited thereto or thereby, and the tamper proof heads may be any suitable tamper proof heads.

Figure 8:
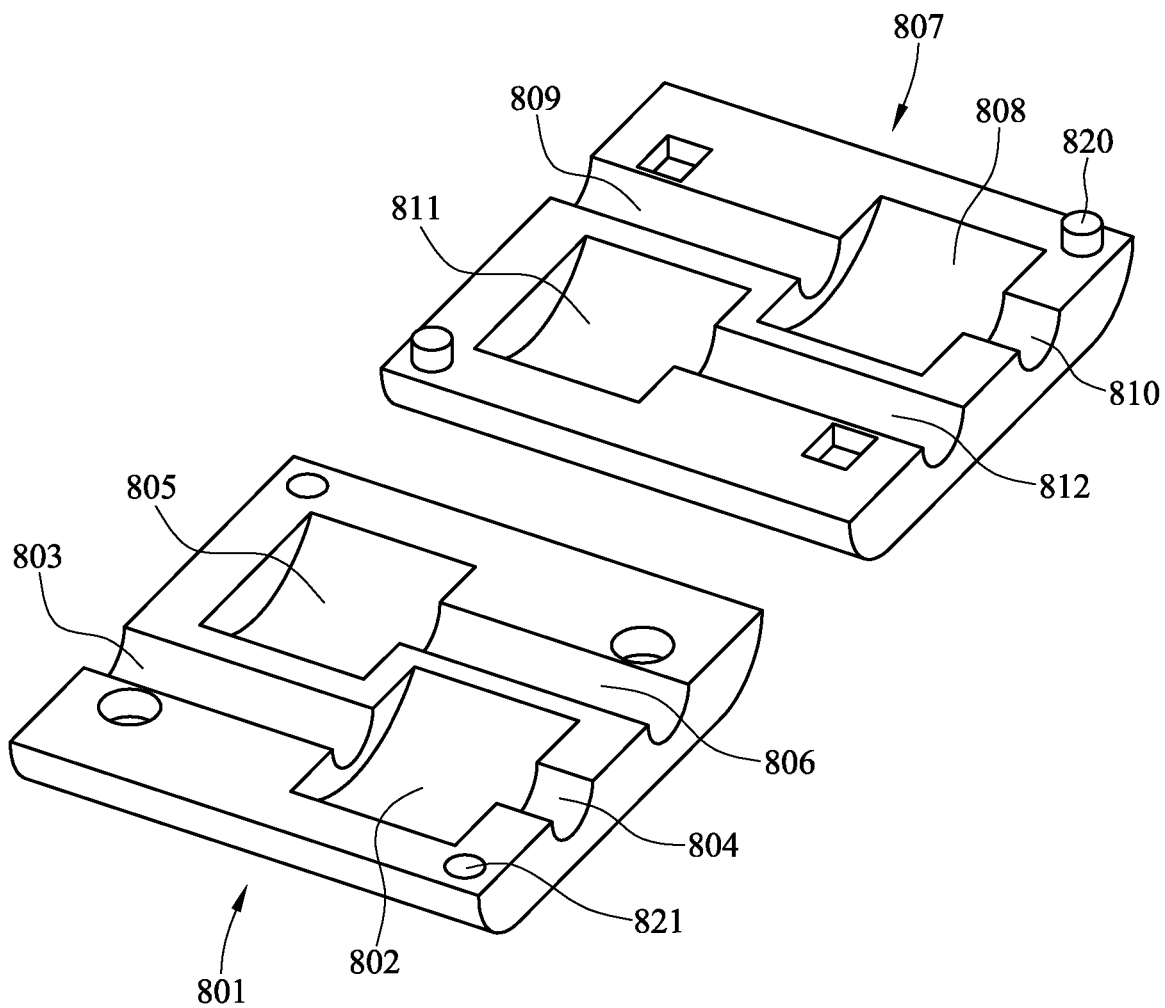
FIG. 8 is a perspective view of a cable lock according to an exemplary embodiment of the present invention.
Figure 9:
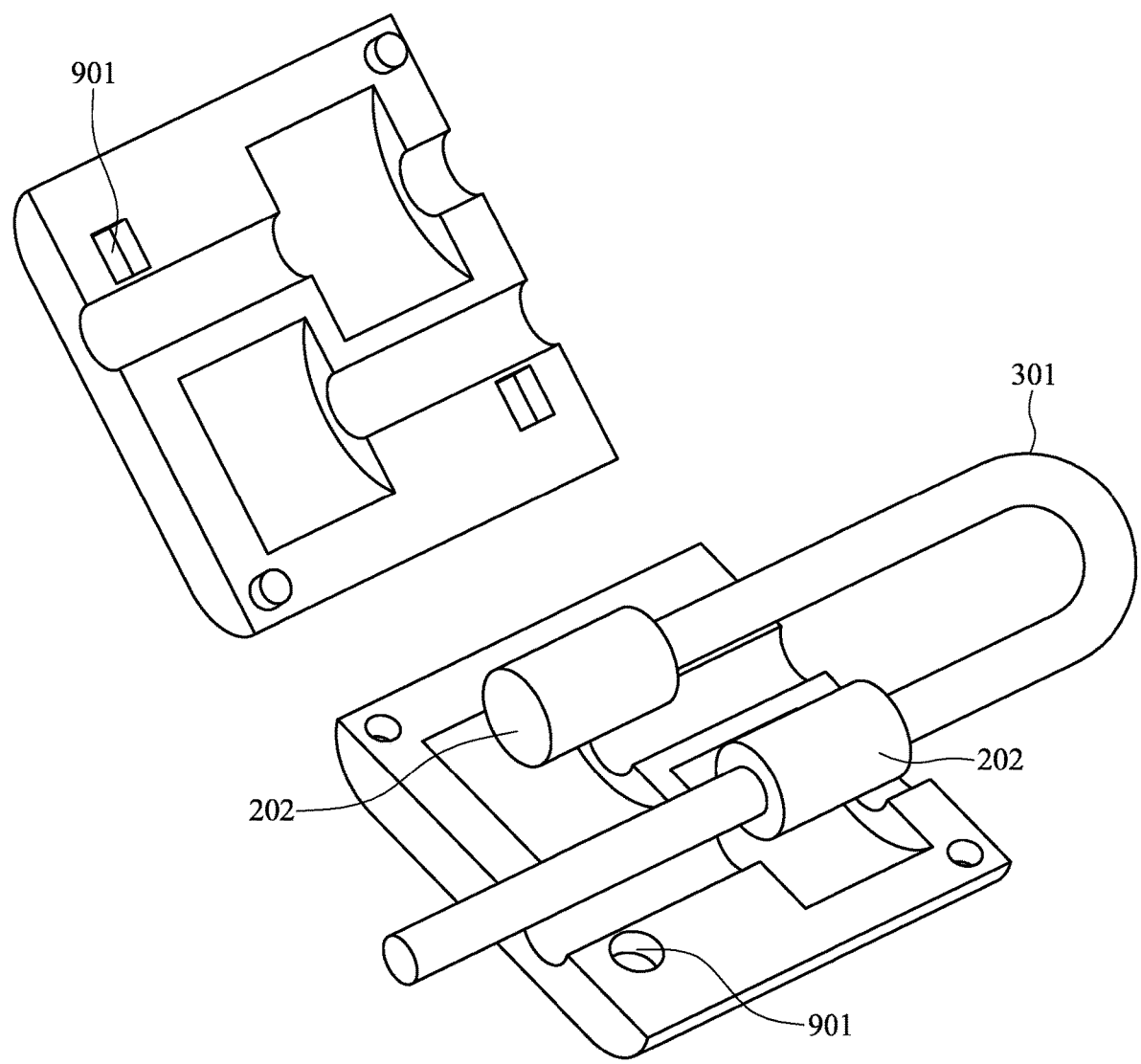
FIG. 9 is a perspective view of a cable lock and a security cable according to an exemplary embodiment of the present invention.
Figure 10:
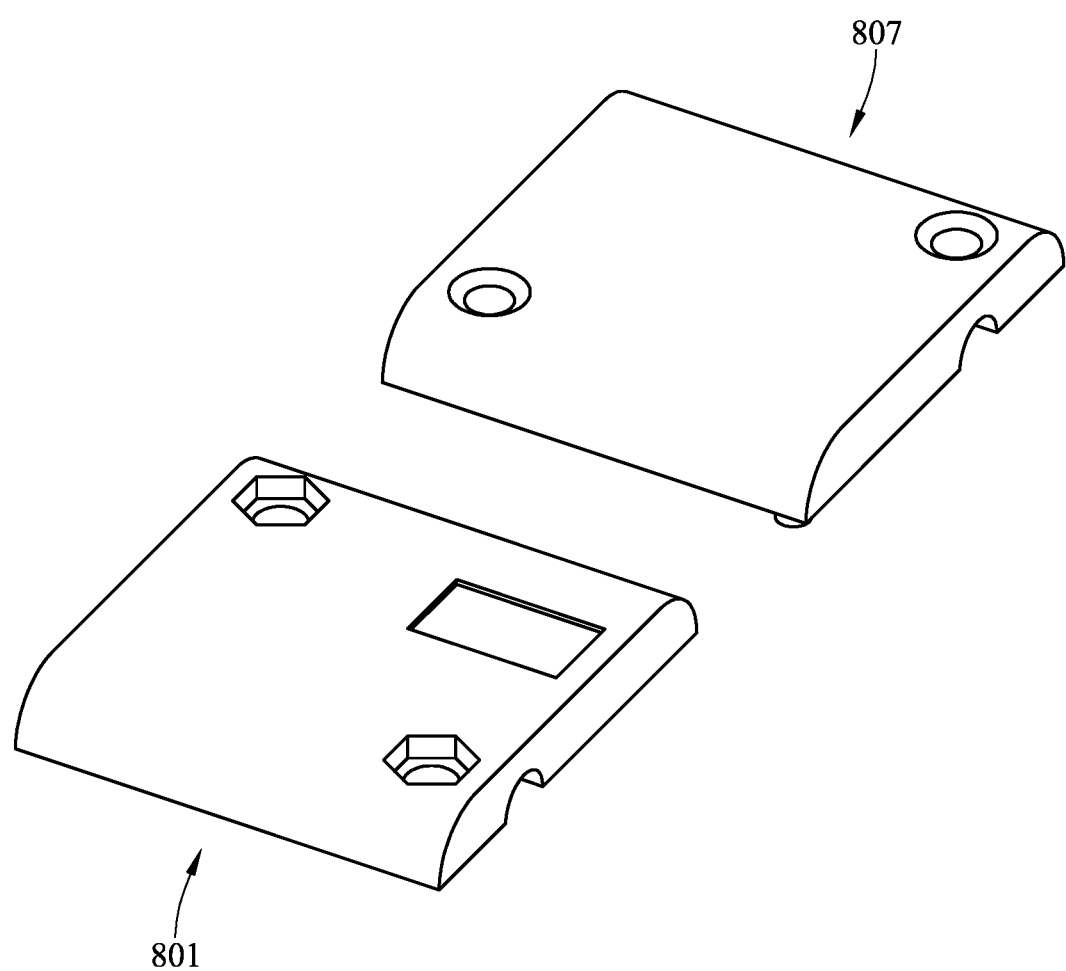
FIG. 10 is a rear view of a cable lock according to an exemplary embodiment of the present invention.
Figure 11:
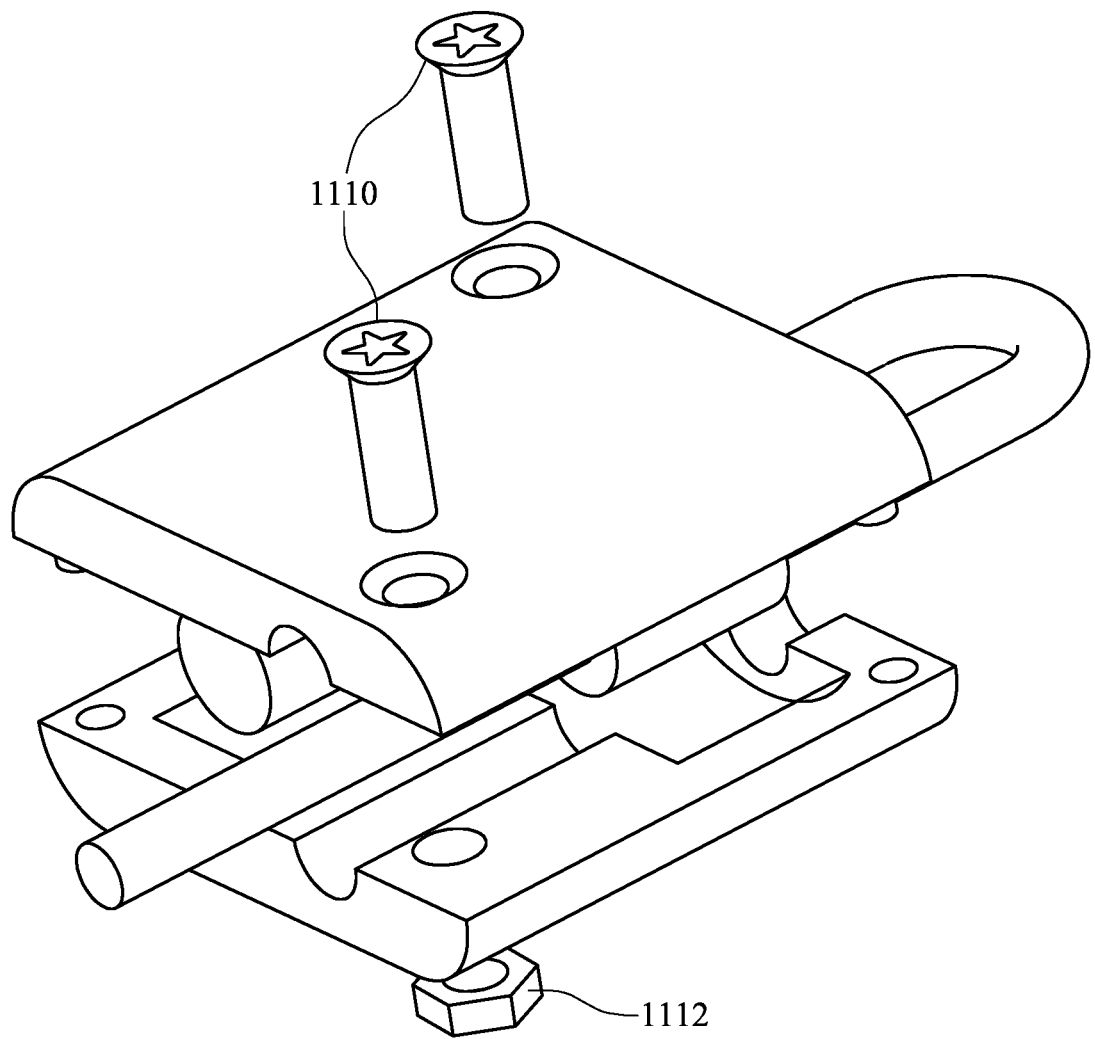
FIG. 11 is an exploded view of a cable lock according to an exemplary embodiment of the present invention.
Figure 12:
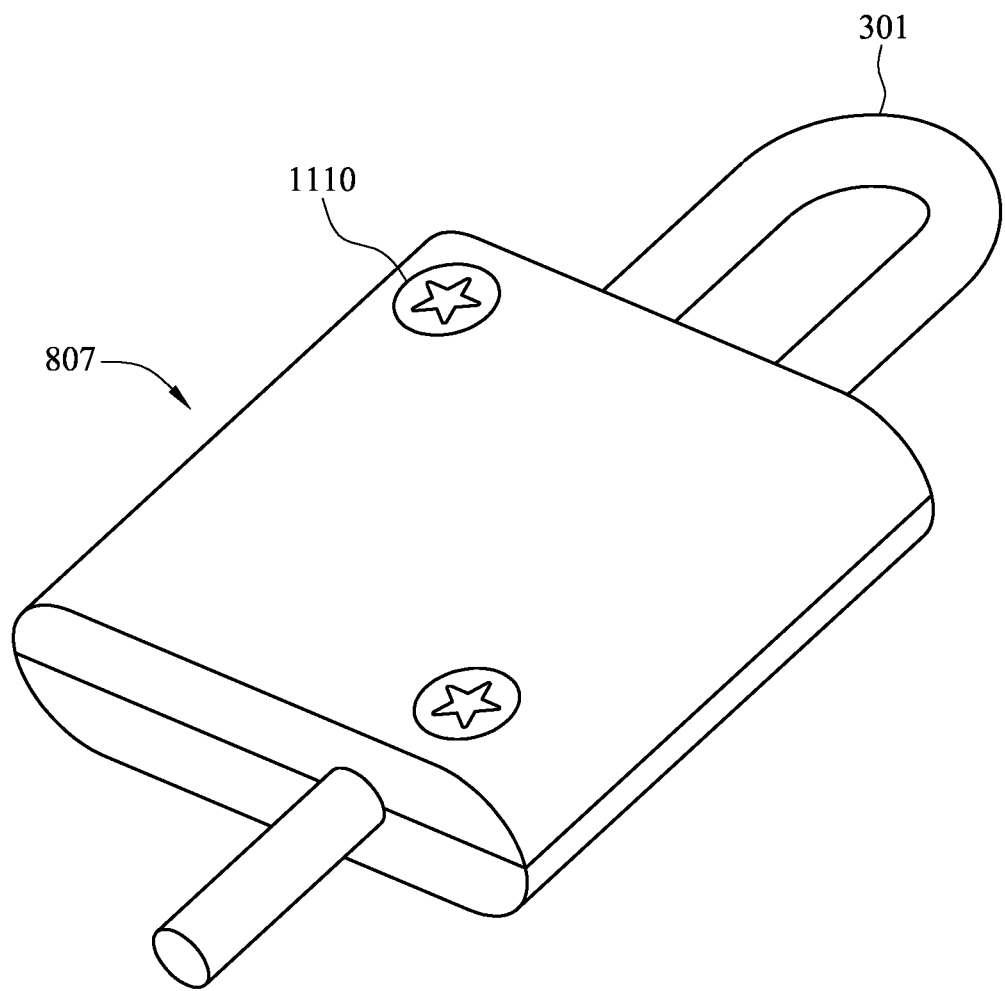
FIG. 12 is a perspective view of a cable lock according to an exemplary embodiment of the present invention.

FIG. 8 is a perspective view of a cable lock according to an exemplary embodiment of the present invention. FIG. 9 is a perspective view of a cable lock and a security cable according to an exemplary embodiment of the present invention. FIG. 10 is a rear view of a cable lock according to an exemplary embodiment of the present invention. FIG. 11 is an exploded view of a cable lock according to an exemplary embodiment of the present invention. FIG. 12 is a perspective view of a cable lock according to an exemplary embodiment of the present invention.

Referring to FIGS. 8-12, a cable lock according to an exemplary embodiment of the present invention may include a first locking plate 801. The first locking plate 801 may include a first indent 802, a first channel 803 connected to the first indent and a second channel 804 connected to the first indent 802 opposite the first channel 803. The first locking plate 801 may include a second indent 805 and a third channel 806 connected to the second indent 805. The cable lock may include a second locking plate 807. The second locking plate 807 may include a third indent 808, a fourth channel 809 connected to the third indent 808 and a fifth channel 810 connected to the third indent 808 opposite the fourth channel 809. The second locking plate 807 may include a fourth indent 811 and a sixth channel 812 connected to the fourth indent 811.

The first and second locking plates 801 and 807 may be fixedly coupled to each other to secure a security cable 301 to a device (see, e.g., FIG. 2). As described below in more detail, stop sleeves 202 coupled to the security cable 301 as described herein may be locked inside the indents formed in the first and second locking plates 801 and 807 to securely attach the security cable 301 to a device, such as a medical device.

According to an exemplary embodiment of the present invention, a width of the second indent 805 along a direction perpendicular to an extending direction of the third channel 806 may be wider than a width of the third channel 806 along the direction perpendicular to the extending direction of the third channel 806. The first, second and/or third indents 802, 808 and 811 may have similar widths to the third channel 806 with respect to channels connected thereto. Thus, any stop sleeves 202 disposed in the indents may become locked in place when the first locking plate 801 is fastened to the second locking plate 807.

According to an exemplary embodiment of the present invention, the cable lock may include at least one hole 901 continuously projecting through the first locking plate 801 and the second locking plate 807. A screw (e.g., screw 1110) may project through the hole. Alternatively a bolt (or the screw) may be threaded into a nut 1112 opposite the bolt. Thus, the first locking plate 801 may be coupled to the second locking plate 807. The screw or the bolt may have a same configuration as the screws described above in more detail.

According to an exemplary embodiment of the present invention, the second locking plate 807 may include at least one protrusion 820 and the first locking plate 801 may include at least one protrusion receiving hole 821 dimensioned and positioned to align the first locking plate 801 with the second locking plate 807 when the first locking plate 801 is fastened to the second locking plate 807.

According to an exemplary embodiment of the present invention, the first indent 802 may be aligned with the third indent 808, and the second indent 805 may be aligned with the fourth indent 811 when the first locking plate 801 is fastened to the second locking plate 807. The first channel 803 may be aligned with the fourth channel 809, the second channel 804 may be aligned with the fifth channel 810, and the third channel 806 may be aligned with the sixth channel 812 when first locking plate 801 is fastened to the second locking plate 807. Thus, the first locking plate 801 may be substantially a mirror image of the second locking plate 807.

According to an exemplary embodiment of the present invention, the first locking plate 801 and the second locking plate 807 may be formed of an injection molded plastic material. As an example, the first locking plate 801 and the second locking plate 807 may each include one or more plastic materials described in more detail above.

According to an exemplary embodiment of the present invention, the security cable may be coupled to a first stop sleeve and a second stop sleeve (see, e.g., stop sleeves 202 described in more detail above). The first stop sleeve may be disposed in the first indent 802 and the third indent 808. The second stop sleeve may be disposed in the third indent 805 and the fourth indent 811 when the first locking plate is fastened to the second locking plate. Thus, the stop sleeves may be unable to move along the extending direction of the channels formed in the first and second locking plates 801 and 807. For example, a loop illustrated in FIG. 9 formed between the first and second stop sleeves corresponds with the cable loop 501 described above in more detail.

While the present invention has been particularly shown and described with reference to exemplary embodiments thereof, it will be understood by those of ordinary skill in the art that various changes in form and detail may be made therein without departing from the spirit and scope of the present invention.

What is claimed is:

1. A cable lock, comprising:
 a first locking plate defining a first inner surface, wherein the first locking plate includes:
  a first indent;
  a first channel connected to the first indent;
  a second channel connected to the first indent, wherein the second channel is separated from the first channel by the first indent;
  a second indent; and a third channel connected to the second indent;
a second locking plate configured to be coupled with the first locking plate, the second locking plate defining a second inner surface configured to be arranged adjacent the first inner surface of the first locking plate when the second locking plate is coupled with the first locking plate, wherein the second locking plate includes:
a third indent;
a fourth channel connected to the third indent;
a fifth channel connected to the third indent, wherein the fifth channel is separated from the first channel by the third indent;
a fourth indent; and
a sixth channel connected to the fourth indent; and
a security cable including a first stop member and a second stop member extending therefrom, wherein the first stop member is disposed in the first indent and the third indent when the second locking plate is coupled with the first locking plate, and wherein the second stop sleeve is disposed in the second indent and the fourth indent when the second locking plate is coupled with the first locking plate to fixedly secure the security cable to the first locking plate and the second locking plate,
wherein the security cable defines a loop portion extending from the first locking plate and the second locking plate when the security cable is fixedly secured to the first locking plate and the second locking plate.

2. The cable lock of claim 1, wherein a width defined by the first stop member is wider than a width defined by the first channel, and wherein a width defined by the second stop member is wider than a width defined by the fourth channel.

3. The cable lock of claim 2, further including at least one orifice continuously extending in the first locking plate and the second locking plate when the second locking plate is coupled with the first locking plate, wherein a connecting member is configured to be secured in the orifice to couple the second locking plate with the first locking plate.

4. The cable lock of claim 3, further including at least one counter sunk screw configured to be arranged in the at least one orifice to couple the second locking plate with the first locking plate.

5. The cable lock of claim 1, wherein the second locking plate includes at least one protrusion, and the first locking plate includes at least one protrusion receiving orifice dimensioned and positioned to receive the at least one protrusion to align the first locking plate with the second locking plate when the second locking plate is coupled with the first locking plate.

6. The cable lock of claim 1, wherein a size of the first indent is substantially the same as a size of the third indent, and wherein a size of the second indent is substantially the same as a size of the fourth indent.

7. The cable lock of claim 6, wherein a diameter of the first channel is substantially the same as a diameter of the fourth channel, and wherein a diameter of the third channel is substantially the same as a diameter of the sixth channel.

8. The cable lock of claim 1, wherein the first locking plate and the second locking plate each include a plastic or a polymer.

9. The cable lock of claim 1, wherein the first locking plate is substantially a mirror image of the second locking plate.

10. The cable lock of claim 1, wherein the security cable includes:
a metal core; and
a coating surrounding the metal core,
wherein at least one of the first stop member or the second stop member is in direct contact with the metal core at a portion of the security cable at which the coating is removed or omitted.

11. A cable lock, comprising:
a first locking plate defining a first inner surface, wherein the first locking plate includes:
a first indent;
a first channel connected to the first indent;
a second channel connected to the first indent, wherein the second channel is separated from the first channel by the first indent;
a second indent; and
a third channel connected to the second indent;
a second locking plate configured to be coupled with the first locking plate, the second locking plate defining a second inner surface configured to be arranged adjacent the first inner surface of the first locking plate when the second locking plate is coupled with the first locking plate, wherein the second locking plate includes:
a third indent;
a fourth channel connected to the third indent;
a fifth channel connected to the third indent, wherein the fifth channel is separated from the first channel by the third indent;
a fourth indent; and
a sixth channel connected to the fourth indent;
a security cable including a first stop member and a second stop member extending therefrom, wherein the first stop member is disposed in the first indent and the third indent when the second locking plate is coupled with the first locking plate, and wherein the second stop sleeve is disposed in the second indent and the fourth indent when the second locking plate is coupled with the first locking plate to fixedly secure the security cable to the first locking plate and the second locking plate,
wherein the security cable defines a loop portion extending from the first locking plate and the second locking plate when the security cable is fixedly secured to the first locking plate and the second locking plate; and
a locking clasp coupled with the security cable, wherein the locking clasp is spaced apart from the first locking plate and the second locking plate, wherein the locking clasp is configured to receive at least one device cable therein.

12. The cable lock of claim 11, wherein a width defined by the first stop member is wider than a width defined by the first channel, and wherein a width defined by the second stop member is wider than a width defined by the fourth channel.

13. The cable lock of claim 12, further including:
at least one orifice continuously extending in the first locking plate and the second locking plate when the second locking plate is coupled with the first locking plate, wherein a connecting member is configured to be secured in the orifice to couple the second locking plate with the first locking plate; and
at least one counter sunk screw configured to be arranged in the at least one orifice to couple the second locking plate with the first locking plate.

14. The cable lock of claim 11, wherein the locking clasp includes a first connection arm and a second connection arm, wherein the first connection arm and the second connection arm are each configured to rotate about the security cable.

15. The cable lock of claim 11, wherein the second locking plate includes at least one protrusion, and the first locking plate includes at least one protrusion receiving orifice dimensioned and positioned to receive the at least one protrusion to align the first locking plate with the second locking plate when the second locking plate is coupled with the first locking plate.

16. The cable lock of claim 11, wherein a size of the first indent is substantially the same as a size of the third indent, and wherein a size of the second indent is substantially the same as a size of the fourth indent.

17. The cable lock of claim 16, wherein a diameter of the first channel is substantially the same as a diameter of the fourth channel, and wherein a diameter of the third channel is substantially the same as a diameter of the sixth channel.

18. The cable lock of claim 11, wherein the first locking plate and the second locking plate each include a plastic or a polymer.

19. The cable lock of claim 11, wherein the first locking plate is substantially a mirror image of the second locking plate.

20. The cable lock of claim 11, wherein the security cable includes:
- a metal core; and
- a coating surrounding the metal core,
- wherein at least one of the first stop member or the second stop member is in direct contact with the metal core at a portion of the security cable at which the coating is removed or omitted.

* * * * *